Nov. 13, 1928.
R. E. BISSELL
1,691,562
APPARATUS FOR ELECTRICALLY HEATING METAL PARTS
Filed Nov. 17, 1926
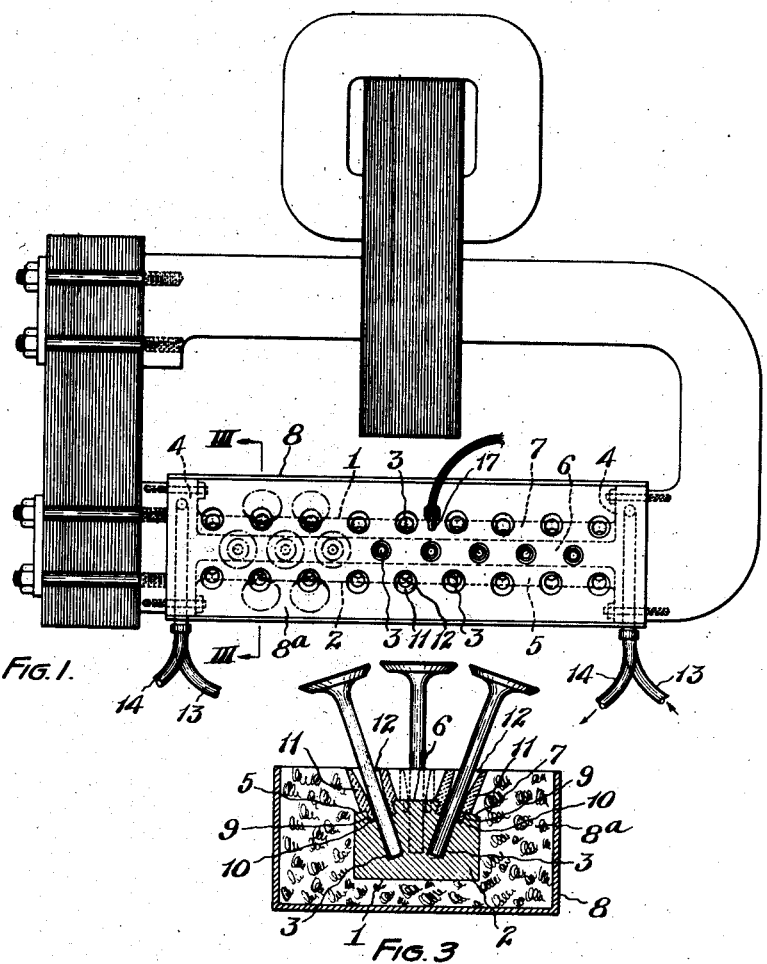
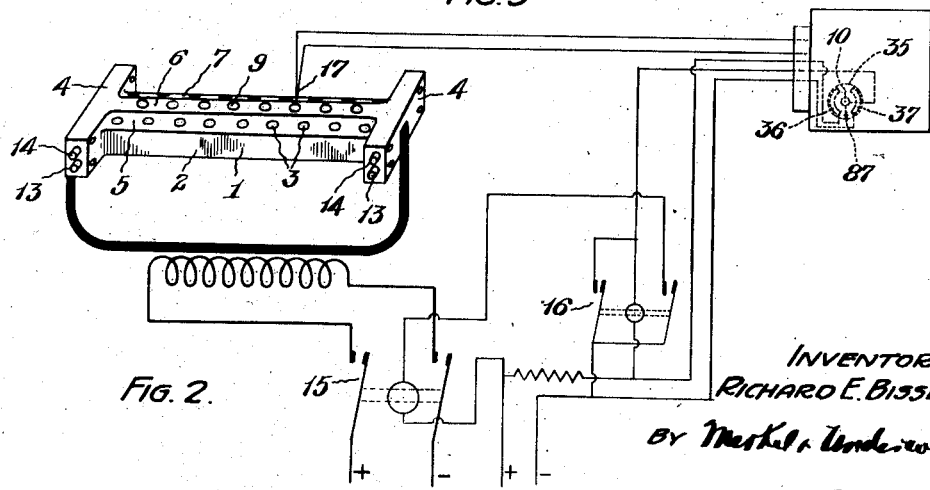
INVENTOR:
RICHARD E. BISSELL
BY Markel & Underwood
ATTORNEYS Patented Nov. 13, 1928.

1,691,562

UNITED STATES PATENT OFFICE.

RICHARD E. BISSELL, OF CLEVELAND HEIGHTS, OHIO, ASSIGNOR TO THOMPSON PRODUCTS, INCORPORATED, OF CLEVELAND, OHIO, A CORPORATION OF OHIO.

APPARATUS FOR ELECTRICALLY HEATING METAL PARTS.

Application filed November 17, 1926. Serial No. 148,817.

My invention relates to a method of, and apparatus for, heating metal parts, and particularly to the heating of metal parts by heat derived from a source of electrical energy.

Furnaces heated by electrical currents are well known in the art, and they have been employed for heating metal parts, but, so far as known to me, they have been so arranged as to heat the parts by radiation and convection, by placing the part in an air zone heated by the electrical element, and they have all been in the form of chambers heated by radiation and convection in which the parts heated did not come into contact with the electrical element.

The object of this invention is to heat metal parts in an economical and efficient way, and to provide a heating means which ocupies a small space, which may be brought to the desired temperature in a short time, and which may be automatically maintained.

It is a further object of the invention to provide a heating means having heating zones which are readily accessible to the articles to be heated, capable of operation by unskilled workmen, and which will not subject the operator to the intense heat incident to the operation of the ordinary furnace.

The invention consists in the process and apparatus hereinafter described and claimed, and includes, among other novel ideas, that of so associating the part to be heated with the heating means as to transfer heat thereto by conduction as well as by radiation.

In the accompanying drawings I disclose one form of apparatus for carrying out my invention which exemplifies the principles thereof, although the invention is capable of embodiment in many other forms.

Figure 1 is a plan view showing the principal elements of my novel apparatus.

Fig. 2 is a diagrammatic view showing the heating element and the electrical circuits to heat the same and automatically control the temperature thereof.

Fig. 3 is a cross-section on line III—III of Fig. 1.

Referring to the drawings in detail in which the same part is designated by the same reference number throughout, the heating element consists of a metallic bar 1 forming a part of the secondary of a transformer circuit such as employed in welding outfits. This bar may be of any material suitable for the purpose, but I now consider it preferable to use what is known as "nichrome" or "Q-alloy", and in the form shown it consists of an elongated central portion 2, provided with a plurality of recesses 3, adapted to receive the parts to be heated, and terminating in heads 4, set at right angles to the axis of the bar. As shown the upper side of this heating bar is provided with three angularly related faces 5, 6 and 7, each face being provided with a series of the heating recesses 3 extending into the bar at right angles to the face, the central series of recesses being preferably offset to lie between the two other series. Any number of recesses may be employed and they may be arranged in any convenient way, the arrangement shown being adopted merely as a means to accommodate as many pieces as possible while securing substantially the same temperature in each recess.

In order to prevent loss of heat by radiation, it is preferable to enclose the bar by heat insulating means $8^a$, such as asbestos enclosed within a container 8. In this case the recesses 3 are enlarged at their upper ends, as indicated at 9 into which are inserted the reduced ends 10 of guiding thimbles 11, having conical apertures 12 which effectively guide the articles to be heated into the recesses 3.

As the temperature of the bar in use may run to almost 2000° F., the heads 4 of the bar 1 become very hot, which may result in injury to the secondary and also unduly heat the primary coil, resulting in loss of efficiency. Furthermore, the heat radiated from such heads is objectionable to the workman attending the machine. It is therefore desirable to cool these heads. This may be done in various ways, but as shown the heads are each provided with an internal passage through which cooling water is caused to circulate by means of pipes 13 and 14 connected to a suitable source of supply.

A very useful characteristic of the bar as above described is that, in use, the portions of the bar immediately surrounding the recesses 2 are at a higher temperature than other parts, because of its decreased cross-section at such points, whereby electric power is economically used.

It is obvious that the bar 1 may be quickly raised to any desired temperature and that such temperature may be maintained for any length of time. In heating a certain part it is desirable to maintain a uniform temperature of the bar and without any attention from the operator. To accomplish this in an effective manner I provide a switch for closing the power circuit which heats the bar and controls the same automatically by a thermo-couple. The arrangement is diagrammatically indicated in Fig. 2, in which 15 designates a switch adapted to open and close the power circuit, the switch being controlled in a well-known way by a relay 16 in an auxiliary circuit, which is in turn controlled by a thermo-couple 17 inserted in a recess of the bar 1. Control of the auxiliary circuit by the thermo-couple 17 is effected by an apparatus of well-known construction made in accordance with the disclosure in the patent to Brewer, No. 1,356,804. In Fig. 2 of the patent is shown a disk 35 mounted on a shaft 10 which is caused to rotate in opposite directions under control of a thermo-couple T. Shaft 10 carries two contact elements, 36 and 37 each adapted to engage stationary contact 87. These parts are diagrammatically shown in Fig. 2 of the drawings of this application and are designated by the same numbers as the corresponding parts of the patent. By this means when the bar exceeds a predetermined temperature the power circuit is opened, and is closed again when the temperature falls below that point. As disclosed in this patent, the temperature may be recorded and signal lamps may be used to indicate the variations in the temperature of the bar. In this way the bar 1 is always maintained at a uniform temperature and lack of attention by the operator will not result in overheating or underheating the parts although they may be subjected to heat for any length of time beyond what is necessary to bring them to the desired temperature. This is quite an important feature as there need be no nice calculation of the heating period, effective results not being dependent upon the skill, experience, or attention of the operator.

The operation of the apparatus described will be apparent. The articles to be heated are inserted in the recesses 3 and permitted to remain until the desired temperature is reached, and may be permitted to remain longer without danger of overheating. It will be observed that, while being subjected to the heat of the bar, the parts are in actual contact therewith to a greater or less extent depending upon the relative dimensions of the part and the recess, and to the extent that they are in contact they will receive heat by conduction from the electrical element, which is a novel idea, so far as known to me.

Where it is desired to exclude air from the part heated the recess 3 may be partly filled with molten lead, sand, salt, or the like, into which the article is inserted. In the use of this feature, the molten lead, etcetera, may be considered a part of the heating bar in which a recess is temporarily formed by the insertion thereinto of the article; in this case, the heat will be transmitted to the bar partly by conduction and partly by convection.

Instead of making the bar 1 straight, as shown in the drawings, it may be made in any other form, for example, it may be made in the form of an annulus, with heating recesses throughout its entire extent; or it may be made in the form of a tubular member, heated in the manner described, that is, by passing a current therethrough, the parts to be treated being inserted within the tube and in engagement with the inside walls thereof.

While I have illustrated but one embodiment of my invention it is obvious that the principle disclosed may be embodied in many other forms. It is therefore to be understood that my invention includes all modifications or changes falling within the terms of the appended claims.

What I claim is:

1. An apparatus for heating metal parts comprising a primary winding and a short circuited secondary unit, including a heating element having one or more recesses adapted to receive the parts to be heated and a laminated element adapted to allow for relative expansion in the other parts of said unit.

2. An apparatus for heating metal parts comprising a U-shaped member of solid metal, a member formed of laminated metal connecting the two arms of the U-shaped member, the laminated sheets being arranged perpendicular to the plane of the U-shaped member to allow of relative expansion between the two arms of the latter, one of the arms of the U-shaped member having a higher electrical resistance than remainder of the U-shaped member, such arm having one or more recesses adapted to receive the parts to be heated and means for causing an electric current to flow around the circuit formed by said U-shaped member and laminated member to heat said arm to the desired temperature.

3. Apparatus for heating metal parts comprising a bar forming a part of the secondary of a transformer, a casing around said bar open at the top and having its bottom and sides spaced from said bar, heat insulating material in the space between said casing and said bar and covering the top of the latter, holes in the top of said bar to receive the articles to be heated and hollow thimbles extending around said holes upwardly to the surface of the heat insulating material.

4. Apparatus for heating metal parts comprising a bar forming a part of the secondary of a transformer, three lines of holes in the top of said bar adapted to receive the stems of poppet valves, the holes in the two outside lines being staggered with respect to the holes in the center line and also inclined outwardly and upwardly away from the holes in the center line.

Signed by me this 15 day of October, 1926.

RICHARD E. BISSELL.